Dec. 12, 1950   J. J. CANALES   2,533,555
WEIGHTED DRILL FOR CUTTING POST HOLES IN ROCK
Filed May 23, 1949
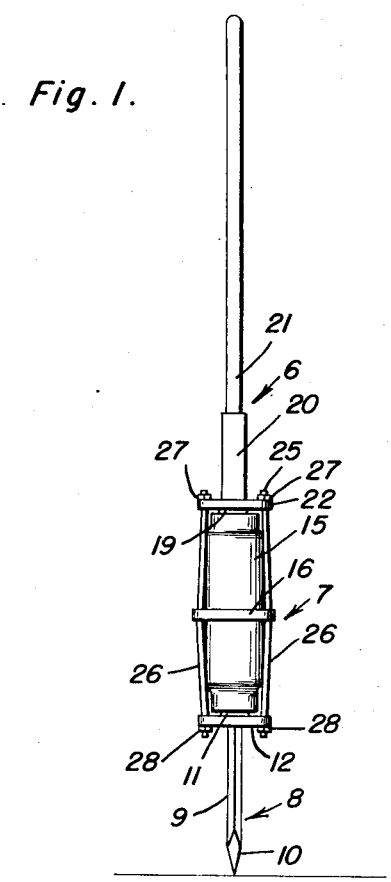
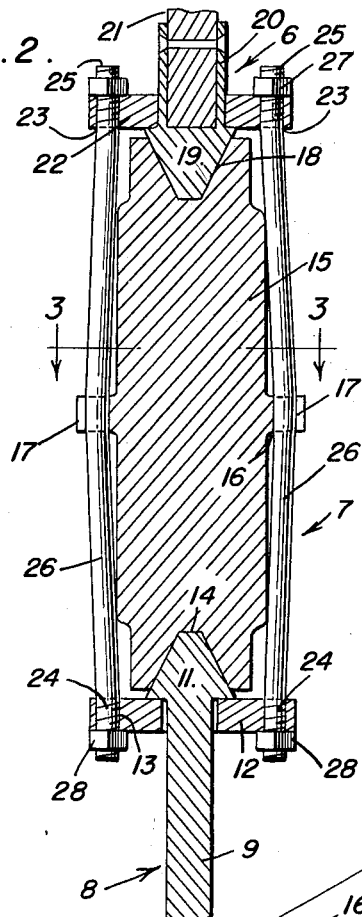
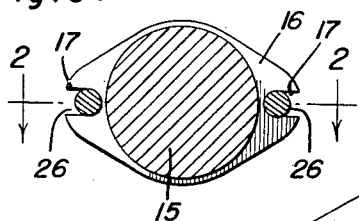
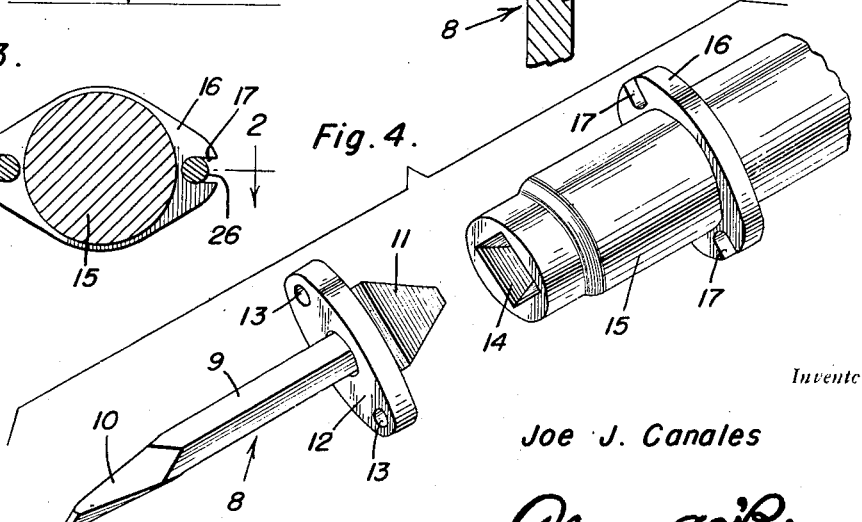
Inventor
Joe J. Canales
By Clarence A. O'Brien
and Harvey B. Jacobson
Attorneys Patented Dec. 12, 1950

2,533,555

UNITED STATES PATENT OFFICE 2,533,555

WEIGHTED DRILL FOR CUTTING POSTHOLES IN ROCK

Joe J. Canales, Uvalde, Tex.

Application May 23, 1949, Serial No. 94,768

2 Claims. (Cl. 255—63)

The present invention relates to a hand-operated rock chiselling or cutting tool which is expressly adapted for drilling a hole, such as a post hole, in bedrock.

Those who are retained or otherwise called upon to erect fences often run into bedrock and, for such reason, encounter a real time and labor-consuming task in digging the necessary post hole or holes. At the present time, all sorts of small drills, chisels, sledge hammers and the like are used to produce a post hole in a body of rock. As a result of studied consideration of the problem, I feel that I have now evolved and produced a suitable hand implement or tool which, being weighted, will enable a single worker to do as much as two or three men would do with tools and implements now available to them.

The implement which I have chosen to attain the ends wanted takes on the general appearance of a concrete tamp and, for that reason, includes a handle, tool means on the working end of the handle, and weight means.

More specifically, I utilize a tamp-like implement for minor rock-drilling requirements which is characterized by a handle unit, a drill unit, and an intervening weight unit which is expressly made and harnessed on adjacent ends of the handle and drill units.

Other objects and advantages will become more readily apparent from the following description and the accompanying illustrative drawings.

In the drawings:

Figure 1 is an elevational view of a post hole drilling implement constructed in accordance with the principles of the present invention;

Figure 2 is an enlarged sectional and elevational view on the line 2—2 of Figure 3, looking in the direction of the arrows;

Figure 3 is a horizontal or cross section on the line 3—3 of Figure 2, looking in the direction of the arrows; and Figure 4 is a group perspective view showing certain of the essential parts.

The three units are identified as the handle unit 6, the weight unit 7 and readily attachable and detachable drill unit 8. The drill unit, as shown in Figure 4, comprises a shank 9 having rock-chiselling or drilling means 10 at one end and having an enlarged assembling and keying head 11 at the opposite end. The head is preferably frusto-pyramidal in form. Mounted on the shank and adapted to abut the keying head is an assembling and take-up washer 12 with bolt holes 13. Obviously, the keying head is adapted to fit into a correspondingly shaped keying socket 14 provided in one end of a heavy weight 15. The weight is of elongated, cylindrical form and has flange means 16 thereon provided with notches 17. The weight is also provided in its upper end with a pyramidal recess or socket 18 to accommodate a correspondingly shaped keying head 19 forming a part of a ferrule 20 to which the wooden or equivalent handle 21 is riveted. Here again, I provide another washer 22 which is similar to the washer 12 and which has bolt holes 23. The respective bolt holes 13 and 23 serve to accommodate the screw-threaded end portions 24 and 25 of the rod-type bolts 26. The screw-threaded ends are provided with clamping and assembling nuts 27 and 28. Thus, taking the two washers and the bolts and the weight, a satisfactory harness is provided whereby said weight is not only keyed but "harnessed" to the respective handle unit and drill unit.

The parts described, the units 6, 7 and 8, are assembled and mechanically keyed and interconnected together in the manner shown and collectively provide a weighty handle-equipped drill which may be satisfactorily pounded and impacted, in customary ramming fashion, against a rock or stone surface for purposes of gradually chiselling or cutting a hole in said rock.

It is submitted that an implement constructed as herein shown and described will aptly serve intended purposes, will meet the requirements of fence builders, and constitutes a device not heretofore provided for the stated purposes.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. In a hand-type rock drill for drilling post holes, a weight having an axially disposed polygonal socket in one end, a drill having a shank with a cutting at one end and a polygonal head at the opposite end, said head fitting removably in said socket means, a collar-type washer fitting around said shank and abutting said head, a handle, a collar surrounding and mounted on said handle and opposed to an adjacent end of said weight, and readily insertable and removable bolts mounted in and connecting said collars to each other and serving to removably mount the drill on said weight.

2. A hand-type rock drilling implement of the class shown and described comprising an elongated weight provided intermediate its ends with an outstanding notched flange, said weight being provided in opposite ends with axial sockets, said sockets being of polygonal cross-sectional form, a tool having a polygonal head fitting into one socket, a collar mounted on and surrounding the shank of said tool and abutting said head, a handle, a head secured on one end of said handle, said head being of polygonal form in cross-section and fitting into the remaining socket, a collar surrounding said handle and resting against said head, and elongated nut-equipped bolts having their end portions connected with the respective collars and paralleling and externally embracing said weight and having intermediate portions fitted into the notches in said flange.

JOE J. CANALES.

REFERENCES CITED

The following references are of record in the file of this patent:

UNITED STATES PATENTS

| Number | Name | Date |
| --- | --- | --- |
| 138,098 | Platt | Apr. 22, 1873 |
| 600,808 | Sinclair | Mar. 15, 1898 |
| 649,464 | Lawson | May 15, 1900 |
| 1,634,298 | Padbury | July 5, 1927 |